US012155809B2

(12) United States Patent
Han et al.

(10) Patent No.: US 12,155,809 B2
(45) Date of Patent: Nov. 26, 2024

(54) PROCESSING SYSTEM FOR STREAMING VOLUMETRIC VIDEO TO A CLIENT DEVICE

(71) Applicant: AT&T Intellectual Property I, L.P., Atlanta, GA (US)

(72) Inventors: Bo Han, Bridgewater, NJ (US); Jackson Jarrell Pair, Los Angeles, CA (US); Tan Xu, Bridgewater, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 265 days.

(21) Appl. No.: 16/446,815

(22) Filed: Jun. 20, 2019

(65) Prior Publication Data
US 2020/0404241 A1 Dec. 24, 2020

(51) Int. Cl.
*H04N 13/194* (2018.01)
*G06T 1/60* (2006.01)
(Continued)

(52) U.S. Cl.
CPC ............ *H04N 13/194* (2018.05); *G06T 1/60* (2013.01); *G06T 9/40* (2013.01); *H04N 7/0117* (2013.01);
(Continued)

(58) Field of Classification Search
CPC .. H04N 13/194; H04N 13/161; H04N 13/117; H04N 7/0117; G06T 9/40
See application file for complete search history.

(56) References Cited
U.S. PATENT DOCUMENTS 8,319,825 B1 * 11/2012 Urbach ................... G06T 15/08
348/42
8,553,028 B1 * 10/2013 Urbach ................. G06T 15/005
345/419
(Continued)

FOREIGN PATENT DOCUMENTS

EP          3595319 A1 *  1/2020   ........... H04N 13/117
WO  WO-2020008106 A1 *  1/2020   ........... H04N 19/17
WO  WO-2020141260 A1 *  7/2020   ............ G06T 9/001

OTHER PUBLICATIONS

Merriam-Webster, definition of "resolution" downloaded Mar. 17, 2020 (Year: 2020).*
(Continued)

*Primary Examiner* — Michael Robert Cammarata

(57) ABSTRACT

A network processing system obtains a viewport of a client device for volumetric video and a two-dimensional (2D) subframe of a frame of volumetric video is obtained associated with the viewport. Viewports may be obtained from the client device or be predicted. 2D subframes and reduced resolution versions of frames can be transmitted to the client device. A client device may request volumetric video from the network processing system and provides a viewport to the network processing system. The client device may obtain from the network processing system reduced resolution versions of volumetric video frames and 2D subframes in accordance with the viewport. The client device may determine whether a current viewport matches the viewport associated with the obtained 2D subframe and provides a display based on either that subframe (upon a match) or a 2D perspective of the reduced resolution frame associated with the current viewport (if no match).

20 Claims, 5 Drawing Sheets

(51) Int. Cl.
  *G06T 9/40* (2006.01)
  *H04N 7/01* (2006.01)
  *H04N 13/111* (2018.01)
  *H04N 13/161* (2018.01)
(52) U.S. Cl.
  CPC ......... *H04N 13/111* (2018.05); *H04N 13/161* (2018.05)

(56) References Cited

U.S. PATENT DOCUMENTS

| | | | |
|---|---|---|---|
| 9,342,925 B2* | 5/2016 | Fujiwara | G06T 15/20 |
| 10,460,700 B1* | 10/2019 | Mendhekar | H04L 65/60 |
| 10,750,139 B2* | 8/2020 | Chu | H04N 13/161 |
| 2011/0187706 A1* | 8/2011 | Vesely | G06T 15/00 345/419 |
| 2016/0027216 A1* | 1/2016 | da Veiga | G06T 19/003 345/419 |
| 2016/0171743 A1* | 6/2016 | Urbach | G06T 15/005 345/423 |
| 2017/0103577 A1* | 4/2017 | Mendhekar | G06T 19/006 |
| 2017/0223368 A1* | 8/2017 | Abbas | H04N 19/146 |
| 2017/0244948 A1* | 8/2017 | Pang | H04N 5/2226 |
| 2017/0257609 A1* | 9/2017 | Chu | H04N 13/161 |
| 2018/0074679 A1* | 3/2018 | Wang | G06F 3/04812 |
| 2018/0176468 A1* | 6/2018 | Wang | H04N 19/46 |
| 2018/0242017 A1* | 8/2018 | Van Leuven | H04N 19/172 |
| 2018/0288423 A1* | 10/2018 | Vembar | H04N 19/503 |
| 2018/0302601 A1* | 10/2018 | Chen | H04N 21/23412 |
| 2019/0080483 A1* | 3/2019 | Mammou | G06T 9/40 |
| 2019/0108656 A1* | 4/2019 | Sugio | G06T 9/00 |
| 2019/0114830 A1* | 4/2019 | Bouazizi | H04N 13/261 |
| 2019/0158815 A1* | 5/2019 | He | H04N 21/234327 |
| 2019/0200046 A1* | 6/2019 | Lucas | H04N 19/124 |
| 2019/0200083 A1* | 6/2019 | Pio | G06F 1/1694 |
| 2019/0200097 A1* | 6/2019 | Lee | H04N 21/816 |
| 2019/0238609 A1* | 8/2019 | Skupin | H04N 13/194 |
| 2019/0246126 A1* | 8/2019 | Abbas | H04N 19/187 |
| 2019/0310472 A1* | 10/2019 | Schilt | H04N 19/597 |
| 2020/0036955 A1* | 1/2020 | Pesonen | H04N 13/15 |
| 2020/0045285 A1* | 2/2020 | Varerkar | H04N 13/111 |
| 2020/0045323 A1* | 2/2020 | Hannuksela | H04N 21/23439 |
| 2020/0068235 A1* | 2/2020 | Han | H04N 21/21805 |
| 2020/0076867 A1* | 3/2020 | Han | H04N 19/37 |
| 2020/0082597 A1* | 3/2020 | Ackerson | G06T 7/557 |
| 2020/0137462 A1* | 4/2020 | He | H04N 21/8456 |
| 2020/0169718 A1* | 5/2020 | Begeja | H04N 13/388 |
| 2020/0228780 A1* | 7/2020 | Kim | H04N 21/6587 |
| 2020/0302655 A1* | 9/2020 | Oh | G06T 9/001 |
| 2020/0365008 A1* | 11/2020 | Sjolund | H04W 4/90 |
| 2021/0021815 A1* | 1/2021 | Wang | H04N 19/119 |
| 2021/0112236 A1* | 4/2021 | Fleureau | H04N 21/8451 |
| 2021/0158575 A1* | 5/2021 | Nakagami | G06T 9/40 |
| 2022/0094909 A1* | 3/2022 | Hannuksela | H04N 19/172 |
| 2022/0141548 A1* | 5/2022 | Niamut | H04N 21/4312 725/116 |
| 2022/0167042 A1* | 5/2022 | Hannuksela | H04L 65/762 |
| 2022/0191543 A1* | 6/2022 | He | H04N 19/597 |
| 2022/0254068 A1* | 8/2022 | Fleureau | G06T 9/00 |
| 2022/0256134 A1* | 8/2022 | Chupeau | H04N 13/161 |

OTHER PUBLICATIONS

Ainala {Khartik Ainala, et al. "An improved enhancement layer for octree based point cloud compression with plane projection approximation," Proc. SPIE 9971, Applications of Digital Image Processing XXXIX, 99710R (Sep. 27, 2016); doi:10.1117/12.2237753 (Year: 2016).*

Park, Jounsup, Philip A. Chou, and Jenq-Neng Hwang. "Rate-utility optimized streaming of volumetric media for augmented reality." IEEE Journal on Emerging and Selected Topics in Circuits and Systems 9.1 (2019): 149-162. (Year: 2019).*

Qian; Bo Han, Jarrell Pair, Toward practical volumetric video streaming on commodity smartphones HotMobile '19, Feb. 27-28, 2019, Santa Cruz, CA, USA. Association for Computing Machinery, New York, NY, USA, 135-140. DOI:https://doi.org/10.1145/3301293. 3302358 (Year: 2019).*

Corbillon, Xavier, et al, "Viewport-Adaptive Navigable 360-Degree Video Delivery", IEEE ICC 2017 Communications Software, Services, and Multimedia Applications Symposium. (Year: 2017).*

Lo, Wen-Chih et al., "360° Video Viewing Dataset in Head-Mounted Virtual Reality", MMSys'17, Jun. 20-23, 2017, Taipei, Taiwan, DOI: hp://dx.doi.org/10.1145/3083187.3083219 (Year: 2017).*

HotMobile '19: Proceedings of the 20th International Workshop on Mobile Computing Systems and ApplicationsFeb. 2019 pp. 135-140https://doi.org/10.1145/3301293.3302358 (Year: 2019).*

Y. Alkhalili, T. Meuser and R. Steinmetz, "A Survey of Volumetric Content Streaming Approaches," 2020 IEEE Sixth International Conference on Multimedia Big Data (BigMM), 2020, pp. 191-199, doi: 10.1109/BigMM50055.2020.00035. (Year: 2020).*

Z. Lai, Y. C. Hu, Y. Cui, L. Sun and N. Dai, "Furion: Engineering high-quality immersive virtual reality on today's mobile devices", Proceedings of MobiCom, pp. 409-421, 2017. (Year: 2017).*

Lanyi He, Wenjie Zhu, Ke Zhang, and Yiling Xu. 2018. View-Dependent Streaming of Dynamic Point Cloud over Hybrid Networks. In Advances in Multimedia Information Processing—PCM 2018. Springer International Publishing, Cham, 50-58 (Year: 2018).*

S. Park, A. Bhattacharya, Z. Yang, M. Dasari, S. R. Das and D. Samaras, "Advancing User Quality of Experience in 360-degree Video Streaming," 2019 IFIP Networking Conference (IFIP Networking), 2019, pp. 1-9, doi: 10.23919/IFIPNetworking.2019. 8816847 (Year: 2019).*

K. Kammachi-Sreedhar, A. Aminlou, M. Hannuksela, and M. Gabbouj. Standard-compliant multiview video coding and streaming for virtual reality applications. In Proceedings of the IEEE International Symposium on Multimedia, ISM '16, San Jose, CA, USA, Dec. 11-13, 2016. (Year: 2016).*

L. Sun et al., "Multi-path multi-tier 360-degree video streaming in 5G networks," in Proceedings of the 9th ACM Multimedia Systems Conference, MMSys 2018, 2018, pp. 162-173. (Year: 2018).*

Lungarao (P. Lungaro, R. Sjöberg, A. J. F. Valero, A. Mittal and K. Tollmar, "Gaze-Aware Streaming Solutions for the Next Generation of Mobile VR Experiences," in IEEE Transactions on Visualization and Computer Graphics, vol. 24, No. 4, pp. 1535-1544, Apr. 2018, doi: 10.1109/TVCG.2018.2794119 (Year: 2018).*

Moreno, C., Chen, Y., Li, M.: A dynamic compression technique for streaming kinect-based Point Cloud data. In: International Conference on Computing, Networking and Communications. IEEE, pp. 550-555 (2017) (Year: 2017).*

Feng Qian, et al. "Optimizing 360 Video Delivery Over Cellular Networks," AllThingsCellular''16, Oct. 3-7, 2016, New York City, NY, USA. © 2016 ACM. ISBN 978-1-4503-4249-0/16/10. DOI: http://dx.doi.org/10.1145/2980055.2980056.

Ahmed Hamza, et al. "Adaptive Streaming of Interactive Free Viewpoint Videos to Heterogeneous Clients," MMSys''16, May 10-13, 2016, Klagenfurt, Austria. © 2016 ACM. ISBN 978-1-4503-4297-1/16/05. DOI: http://dx.doi.org/10.1145/2910017.2910610.

Tuan Thanh Le, et al., "Efficient Transcoding and Encryption for Live 360 CCTV System," Appl. Sci. 2019, 9, 760; doi:10.3390/app9040760, www.mdpi.com/journal/applsci.

Simone Mangiante, "VR is on the Edge: How to Deliver 360° Videos in Mobile Networks," VR/AR Network '17, Aug. 25, 2017, Los Angeles, CA, USA © 2017 ACM ISBN ISBN 978-1-4503-5055-6/17/08. https://doi.org/10.1145/3097895.3097901.

"Encoding Video at the Edge with Intel® Xeon® Processors," Solution Brief | Encoding Video at the Edge with Intel® Xeon® Processors, Copyright © 2017 Intel Corporation.

Feng Qian, "Flare: Practical Viewport-Adaptive 360-Degree Video Streaming for Mobile Devices," MobiCom'18, Oct. 29-Nov. 2, 2018, New Delhi, India © 2018 Association for Computing Machinery. ACM ISBN 978-1-4503-5903-0/18/10., https://doi.org/10.1145/3241539.3241565.

Kobbelt, Leif & Botsch, Mario. (2004). A Survey of Point-Based Techniques in Computer Graphics. Computer. 28. 801-814. 10.1016/j.cag.2004.08.009.

(56) References Cited

OTHER PUBLICATIONS

Kowalski, Marek & Naruniec, Jacek & Daniluk, Michal. (2015). Livescan3D: A Fast and Inexpensive 3D Data Acquisition System for Multiple Kinect v2 Sensors. 318-325. 10.1109/3DV.2015.43.
Adrien Maglo, Guillaume Lavoué, Florent Dupont, Céline Hudelot, 2013. 3D mesh compression: survey, comparisons and emerging trends. ACM Comput. Surv. 9, 4, Article 39 (Sep. 2013), 40 pages.
Ruwen Schnabel and Reinhard Klein, In proceedings of Symposium on Point-Based Graphics 2006, Eurographics, Jul. 2006, Presented at Symposium on Point-Based Graphics, 2006.

* cited by examiner

PROCESSING SYSTEM FOR STREAMING VOLUMETRIC VIDEO TO A CLIENT DEVICE

The present disclosure relates generally to volumetric video streaming, and more particularly to devices, non-transitory computer-readable media, and methods for providing a two-dimensional subframe and a reduced resolution version of a frame of a volumetric video, and to devices, non-transitory computer-readable media, and methods for presenting a two-dimensional subframe or a two-dimensional projection from a reduced resolution version of a frame of a volumetric video.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
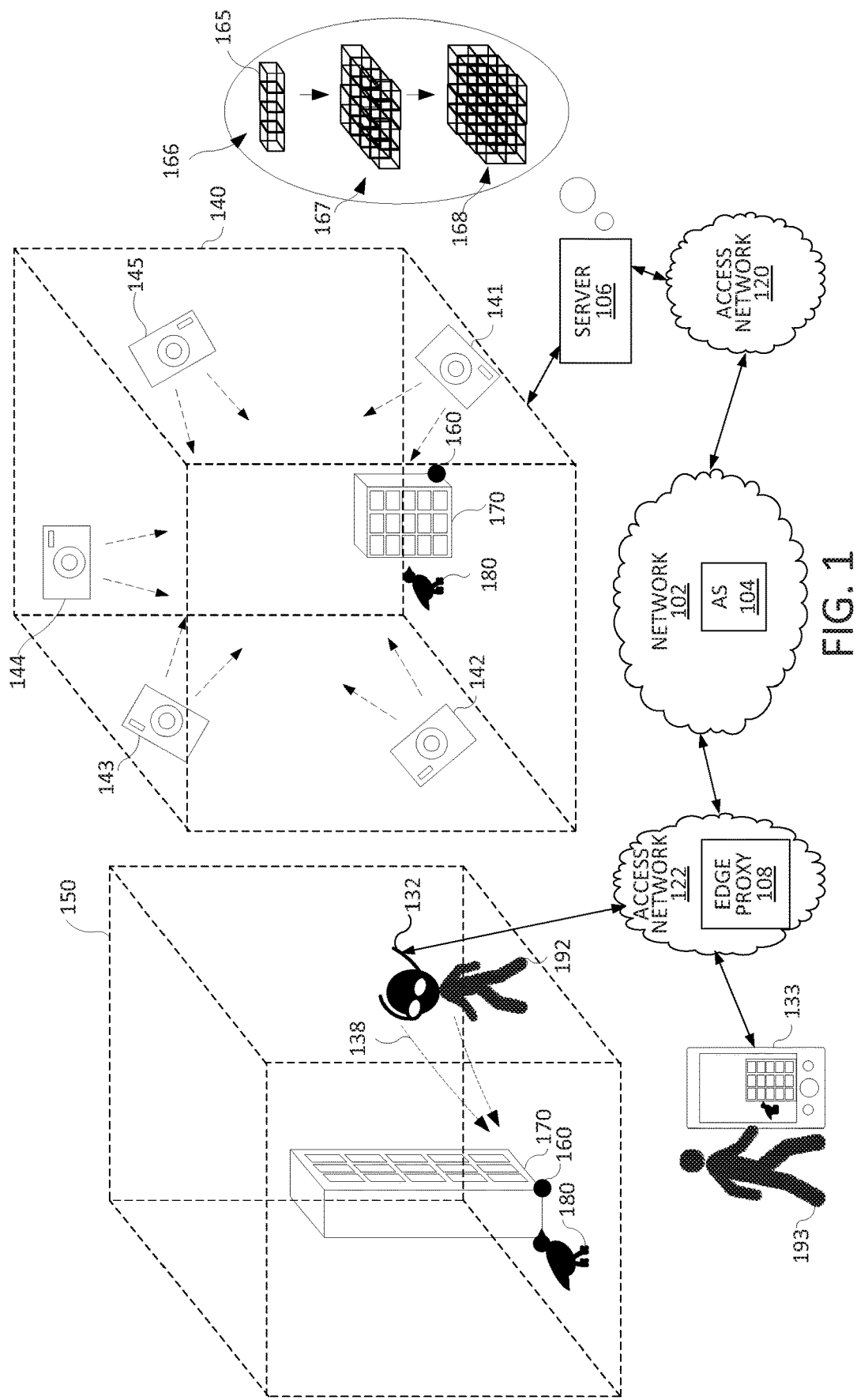
FIG. 1 illustrates an example network related to the present disclosure.

In one example, the present disclosure describes a device, computer-readable medium, and method for providing a two-dimensional subframe and a reduced resolution version of a frame of a volumetric video. For instance, a processing system including at least one processor may obtain a viewport of a client device for a volumetric video, obtain a two-dimensional subframe of a frame of the volumetric video, the two-dimensional subframe associated with the viewport of the client device, and-transmit, to the client device, the two-dimensional subframe and a reduced resolution version of the frame.

In another example, the present disclosure describes a device, computer-readable medium, and method for presenting a two-dimensional subframe or a two-dimensional projection from a reduced resolution version of a frame of a volumetric video. For instance, a processing system including at least one processor may request a volumetric video from a network-based proxy, provide a viewport to the network-based proxy, obtain, from the network-based proxy, a reduced resolution version of the frame and a two-dimensional subframe in accordance with the viewport, and determine whether a current viewport matches the two-dimensional subframe. When the current viewport does not match the two-dimensional subframe, the processing system may render a two-dimensional projection from the reduced resolution version of the frame in accordance with the current viewport. The processing system may then display one of: the two-dimensional subframe or the two-dimensional projection from the reduced resolution version of the frame.

The present disclosure describes systems to deliver immersive viewing experiences of volumetric videos to all types of mobile devices, regardless of their computational power and hardware configuration. In one example, the decoding of compressed volumetric videos is offloaded from mobile devices to mobile edge proxies. Directly delivering uncompressed volumetric videos to mobile devices is bandwidth consuming. For instance, the bitrate of a point cloud-based volumetric video with around 50K points per frame on average may be as high as 100 Mbps. To illustrate, with around 50K points per frame on average, the bandwidth for streaming uncompressed frames at 24 FPS is $9 \times 50K \times 24 \times 8 = 86.4$ Mbps (where each point occupies 9 bytes: position (X, Y, Z; 2 bytes each) and color (R, G, B; 1 byte each)). Despite the high bandwidth (up to 40 Mbps) offered by Long Term Evolution (LTE) cellular networks, the playback experience may include unacceptably long stalls. Although point cloud compression can reduce the network data usage of volumetric video streaming, the decoding performance on a high-end smartphone for dense point clouds may still be insufficient, e.g., ranging from 1.5 to 13.9 frames per second (FPS) for frames ranging in size from 100.7 K to 12.6K (which is lower than the 24-30 FPS generally understood to correlate to a positive viewing experience).

In one example, a client device may send a current or recent viewport, a predicted future viewport, or a sequence of historical and/or predicted viewports to a network-based proxy (e.g., a server running on a mobile edge cloud). In one example, the network-based proxy may then transcode a volumetric video frame (e.g., a point cloud-based frame) into a pixel-based frame, referred to herein as a "subframe" or "two-dimensional (2D) subframe," based upon the viewport(s) obtained from the client device, and provide the 2D subframe to the client device. The 2D subframe may comprise a 2D image that is rendered based upon the visual information of the volumetric video frame (e.g., a point cloud) from a given perspective (e.g., a location, an orientation, and a field-of-view (FoV) which together may be referred to as a viewport). In one example, the network-based proxy may be equipped with graphics processing units (GPUs). In particular, the parallelism provided by GPUs is well-suited to alleviate the high decoding demand of compressed/encoded volumetric video.

In one example, a network-based proxy may also include one or more machine learning algorithms (MLAs) or machine learning models (MLMs) to predict future viewports. As referred to herein, a machine learning model (MLM) (or machine learning-based model) may comprise a machine learning algorithm (MLA) that has been "trained" or configured in accordance with input data (e.g., training data) to perform a particular service, e.g., to predict viewports for viewing a volumetric video. Examples of the present disclosure are not limited to any particular type of MLA/model, but are broadly applicable to various types of MLAs/models that utilize training data, such as support vector machines (SVMs), e.g., linear or non-linear binary classifiers, multi-class classifiers, deep learning algorithms/models, decision tree algorithms/models, k-nearest neighbor (KNN) clustering algorithms/models, and so forth. Notably, a MLA/MLM-based viewport prediction may achieve greater accuracy than other techniques, such as linear interpolation, entropy-based predictions, and so forth. However, such MLA/MLM-based predictions may be too computationally intense to run on a mobile devices. Accordingly, examples of the present disclosure reduce the computation overhead of decoding, rendering, and displaying volumetric video on mobile devices.

Both regular and 360-degree videos are two-dimensional (2D) on either a plane or a sphere. In contrast, volumetric videos are three-dimensional (3D), comprising elements such as voxels (volume pixels) or 3D meshes (polygons). Different from 360-degree videos which are captured inside-out, volumetric videos are created outside-in which enables watching the same object from different directions. In one example, volumetric videos are captured using multiple RGB-D cameras with depth sensors, which acquire 3D data from different viewpoints. The acquired data may then be merged to obtain the entire scene. In addition, a volumetric video experience may provide six degrees of freedom (6 DoF), allowing a viewer to freely change both the position (X, Y, Z) and the orientation (yaw, pitch, roll) of a viewport. Regular videos provide no viewport freedom, and 360-degree videos allow only three degrees of freedom (3 DoF) since the viewer's translational position is fixed. Volumetric videos may be immersive, interactive, and expressive, and can support numerous use cases in diverse fields, such as entertainment, medicine, education, and so forth.

Volumetric videos can be represented in different ways. The present disclosure is described primarily in connection with examples utilizing a point cloud representation, where each video frame includes multiple voxels or points. A point cloud frame structure is a popular way to represent 3D objects due to a simple data structure (e.g., where each point occupies 9 bytes: position (X, Y, Z; 2 bytes each) and color (R, G, B; 1 byte each)) and acceptable rendering performance. However, it should be understood that the present disclosure is equally applicable to other representations such as 3D meshes. For instance, a 3D mesh-based volumetric video may employ a collection of meshes, which can be triangles, quadrangles, or general polygons, to represent the geometry of 3D models.

In any case, delivering volumetric video as a sequence of frames (e.g., comprising a stream of point clouds) to resource-constrained mobile devices and over bandwidth-limited wireless links is challenging to several reasons. First, a point cloud stream may utilize a large bandwidth, and wireless delivery may be impractical for many users without the support of future 5G networks. Second, unlike regular pixel-based videos that can be decoded using dedicated hardware, at present, decoding volumetric videos may be limited to software-based processes, which may incur a high computational overhead. Third, adaptive-bitrate (ABR) video streaming systems are widely available for 2D video and may utilize rate adaptation, quality of experience (QoE) inference, and buffer control. However, corresponding tools for volumetric video streaming may be either unavailable or nascent.

Examples of the present disclosure may relate to compressed volumetric videos as original source content. For instance, volumetric videos associated with the present disclosure may compress 3D objects via an octree-based approach. To illustrate, an octree is a tree data structure that partitions a 3D region by recursively dividing the 3D region into eight subregions, with the level of detail being controlled by the height of the tree. When applied to a point cloud, an octree efficiently stores the points in such a way that the octree nodes correspond to regions of the space of the volumetric video that contain at least one point; the best estimation of the points' locations is given by the leaf nodes. In addition to compressing a single point cloud (or a single point cloud-based volumetric video frame), the octree can be extended to perform differential (delta) encoding between two point clouds (or interframe compression for a point cloud-based volumetric video).

A compressed/encoded volumetric video may reduce the network bandwidth for streaming the volumetric video to an endpoint device. However, directly decoding a compressed point cloud-based volumetric video on an endpoint device (such as a resource-constrained mobile device) may be computation intensive. For example, as described above, a mobile device (e.g., a high-end cellular smartphone) may achieve a FPS ranging from 1.5 to 13.9, which may be due to the costly operations of walking through the octree, inspecting each node, and reconstructing the decoded data to be consumed by the shader. Octree-based encoding may be lossy. Therefore, a point cloud processing library may support different resolution profiles that control the video quality by adjusting the height of the octree. For higher-resolution profiles, the FPS and compression ratio may further degrade. In addition, interframe encoding/compression of a point cloud-based volumetric video may further reduce the size (e.g., the data size, or data volume) of the volumetric video (and hence also the network bandwidth for streaming the volumetric video), but at the cost of even slower decoding speed on an endpoint device (e.g., a cellular smartphone).

In one example, the present disclosure introduces a network-based proxy (e.g., a server, or proxy server, that may be deployed at a network edge cloud) that transcodes the volumetric video stream (e.g., point clouds) into a 2D (e.g., pixel-based) video stream that is delivered to the endpoint device and that captures the user's viewport. In accordance with the present disclosure, the 2D video stream can be efficiently decoded in accordance with the capabilities of current and widely-available mobile devices, such as H.264/H.265 decoders. In addition, the network-based proxy may also provide a lower quality point cloud stream (e.g., reduced resolution versions of point cloud frames) to accommodate possibly inaccurate viewport predictions. Notably, it has been demonstrated that commodity edge servers are capable of decoding point cloud streams at line rate. For instance, for single-core decoding, a mid-range commodity server may outperform a current top-end smartphone by approximately 200 percent in terms of FPS. In addition, it has been determined that server performance scales well with the number of threads, and outperforms an example smartphone by up to 450 percent in a multi-core scenario. For instance, with 12.6K, 25.2K, 50.4K, 75.5K, and 100.7K points per frame, an example server may achieve decoding FPS rates of up to 190, 95, 47.0, 29.2, and 21.4, respectively.

In one example, network-based proxy transcoding may proceed as follows and may be subject to certain constraint based upon network and device capabilities. In one example, the process may include a startup phase (before the actual video playback) where a client device may request volumetric video frames from a video server or from a network-based proxy (e.g., deployed in an edge cloud, if the frames are already cached therein or otherwise cached at the edge cloud). For example, there may initially be no information to guide viewport selection for rendering 2D subframes. Therefore, the client device may render 2D projections from an initial sequence of volumetric video frames. After the startup, or bootstrapping phase, the operations may include: (1) the client device may send a volumetric video content request to the network-based proxy along with at least one viewport (position and orientation). For instance, the client device may send a current or recent viewport, or may send a viewport movement trace indicating a recent viewport history. In one example, the client device may also transmit a current buffer occupancy of a volumetric video player of the client device.

The operations may further include: (2) The network-based proxy may predict a future viewport at future time T. The prediction may be based on the information received from the client device regarding one or more historical viewports. The prediction may also be based upon one or more additional factors, such as popular viewports among a plurality of prior viewers, "important" viewports as determined via an image salience detection algorithm, and so forth. If the predicted viewport has already been transcoded into a 2D/pixel-based subframe and cached locally (e.g., at the network-based proxy and/or at one or more other devices in the same edge cloud), the network-based proxy may retrieve and send the 2D subframe to the client device. Otherwise, the network-based proxy may send a request to obtain at least a portion of the volumetric video (e.g., one or more frames, which at a minimum may include the frame corresponding to the future time T). The at least the portion of the volumetric video may be a high-quality version, e.g., having the best available visual quality (and which may therefore comprise the greatest data volume and/or streaming bitrate as compared to possibly other available versions of the volumetric video), or which may comprise a second highest quality version (from among available versions), a third highest quality version, etc. In one example, the quality of the at least the portion of the volumetric video that is requested may be selected based upon one or more network conditions between the video server and the network-based proxy, e.g., a latency, a throughput, an available bandwidth, etc.

The operations may further include: (3) In response to the request, the video server may send the requested portion of the volumetric video (the one or more frames) to the network-based proxy. (4) Upon receiving the one or more frames, the network-based proxy may transcode the volumetric video frame(s) into at least one 2D subframe. For instance, this step may involve generating a 2D subframe of a frame of the volumetric video corresponding to time T in accordance with the predicted viewport for time T. In one example, the network-based proxy may generate multiple 2D subframes for a sequence of one or more frames of the volumetric video. In one example, the network-based proxy may leverage graphics processing unit (GPU)-accelerated decoders to transcode the volumetric video frames into pixel-based 2D subframes in accordance with the predicted viewports at successive times. In one example, the network-based proxy may also encode one or more of the 2D subframes, e.g., intraframe encoding and/or interframe encoding. The encoding may be lossless or may be lossy.

In one example, the encoding parameters may be preselected (e.g., set by a network operator). In another example, the encoding parameters may be set in accordance with the capabilities of the client device (e.g., in accordance with screen size, a maximum screen resolution, a maximum frame rate for 2D video at a certain screen resolution, etc.), in accordance with network capabilities, such as a maximum bandwidth that may be provided to individual mobile devices (e.g., client devices) by a base station, processor and memory capabilities of the network-based proxy, and so forth. In one example, the network-based proxy may also re-format the original high-quality volumetric video frame(s) into a reduced resolution version of the frame (or reduced resolution versions of the frames). For instance, lower quality frames may have a reduced data volume for each frame, and a correspondingly reduced upper bound of visual quality if rendering and display of visual information proceeds therefrom. In one example, the reduced resolution version(s) of the frame(s) may be generated via voxel downsamping, for instance. In one example, the reduced resolution version(s) may alternatively or additionally be compressed/encoded. In one example, the encoding parameters for the compressed version of the frame (or frames) may be in accordance with client device or network capabilities (e.g., similar to as described above in connection with encoding parameters for the 2D subframe(s)). In one example, the encoding of the compressed version of the frame(s) may include intraframe and/or interframe octree compression/encoding.

The operations may further include: (5) The network-based proxy may deliver both the transcoded 2D subframe (or one or more subframes comprising a sequence of 2D video) and the lower-quality, or reduced resolution volumetric video frame(s) to the client device for playback. (6) At playback time T, the client device may check whether the viewport in the delivered 2D subframe is consistent with the current viewport at the client device. If consistent, the client device may decode the 2D subframe (e.g., if encoded), and render and display the 2D subframe and part of a sequence of 2D video. It should be noted that this step may also include decoding one or more other 2D subframes (e.g., in a sequence, where the 2D subframes may be interframe encoded). On the other hand, when the client device determines that the current viewport at time T does not match the viewport associated with the 2D subframe that is delivered for time T, the client device may decode the lower-quality, reduced resolution volumetric video frame delivered for time T (if the compression includes encoding), and render and display the visual content in accordance with the current viewport.

As indicated in connection with (2) above, the network-based proxy may cache 2D subframes locally. Since users can freely control their viewing directions when watching volumetric videos, the viewport movement trajectory varies for different viewers. In one example, the present disclosure may track and store information regarding the viewing density for the volumetric video, e.g., the percentage or number of viewers engaging in a particular viewport and/or perspective regarding a frame or sequence of frames (e.g., a "heatmap"). It is observed that there are certain areas with a greater viewing density ("hot areas") for almost all videos, which means that most users will watch similar portions of the videos. In this regard, in one example, the present disclosure may provide a cache-matching policy such that the network-based proxy may cache a 2D subframe having a given viewport/perspective if the requested viewport has been viewed for more than X % of the previous viewing sessions (e.g., 80%, 90%, etc. within a sliding time window, exceeding a given time-weighted threshold, or according to a similar formula).

In one example, the network-based proxy may also determine the video quality of the 2D subframe based on the estimated throughput between the network-based proxy and the client device. For example, if the estimated throughput is 2 Mbps, the selected video encoding rate should be lower than 2 Mbps. In one example, if the cached 2D subframe does not have the same quality as the one chosen by the network-based proxy, the network-based proxy may still download the frame from the video server and generate the 2D subframe therefrom at the selected quality. Alternatively, or in addition, the network-based proxy may create the 2D subframe at the selected quality by downsampling from a higher quality version of the 2D subframe that may be locally cached (at the network-based proxy, or at least stored on one or more other devices in the same edge cloud).

In one example, the present disclosure may address scalability issues with volumetric video, where proxy-generated pixel-based video streams may be distributed by load balanced origin servers and content distribution networks (CDN). It should also be noted that the present disclosure is applicable to a wide variety of viewing devices, in addition to cellular smartphones and tablets. For instance, the network-based proxy distributed architecture may be used for volumetric content delivery to smart televisions, set top boxes, augmented reality and/or virtual reality headsets, smart-watches, and so forth. In addition to achieving viewer-acceptable frame rates, examples of the present disclosure may also contribute to extending battery life, and to allowing reductions in device form factor and weight. For instance, a lightweight AR headset may be enabled by reductions in battery requirements, processor requirements (e.g., central processing unit-based and/or GPU-based), and memory requirements provided by the network-based proxy computational offloading. These and other aspects of the present disclosure are described in greater detail below in connection with the examples of FIGS. 1-5.

To further aid in understanding the present disclosure, FIG. 1 illustrates an example system 100 in which examples of the present disclosure for providing a two-dimensional subframe and a reduced resolution version of a frame of a volumetric video and/or for presenting a two-dimensional subframe or a two-dimensional projection from a reduced resolution version of a frame of a volumetric video may operate. The system 100 may include any one or more types of communication networks, such as a traditional circuit switched network (e.g., a public switched telephone network (PSTN)) or a packet network such as an internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

Figure 5:
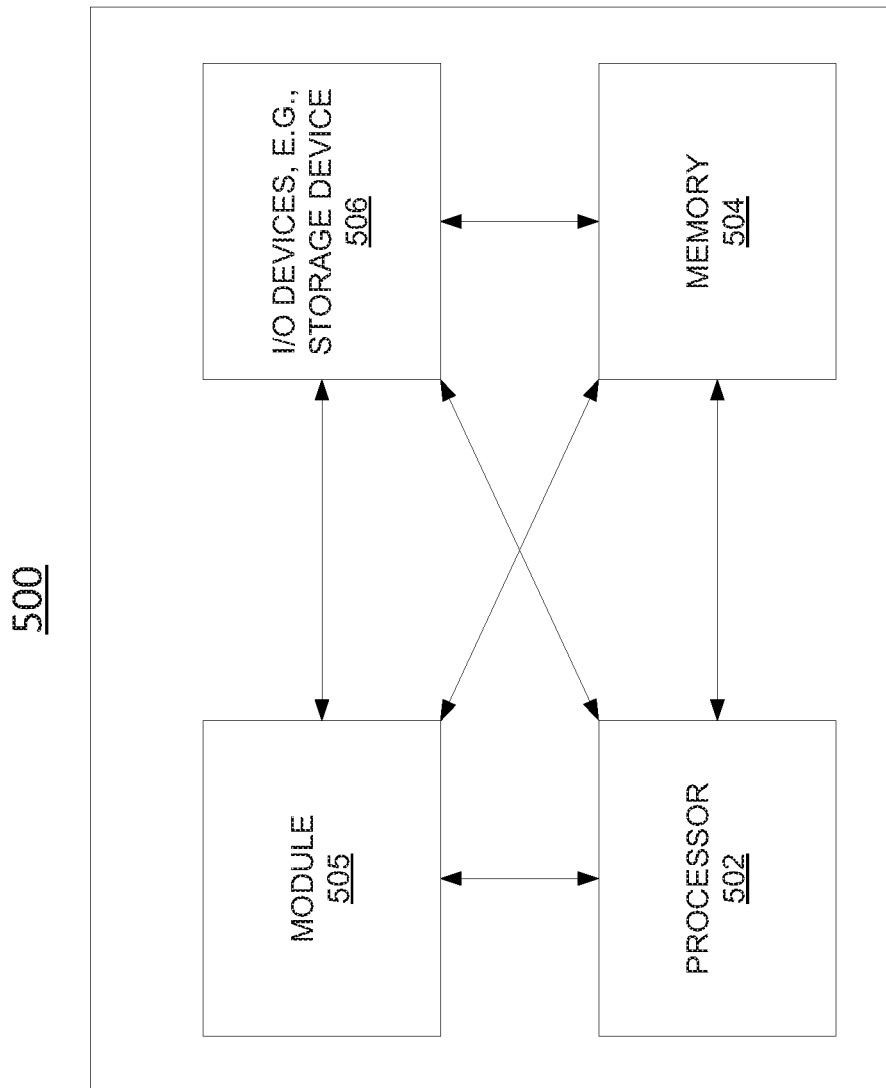
FIG. 5 illustrates a high level block diagram of a computing device specifically programmed to perform the steps, functions, blocks and/or operations described herein.

In accordance with the present disclosure, application server (AS) 104 may comprise a computing system or server, such as computing system 500 depicted in FIG. 5, and may be configured to provide one or more operations or functions in connection with examples of the present disclosure for providing a two-dimensional subframe and a reduced resolution version of a frame of a volumetric video. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 5 and discussed below) or multiple computing devices collectively configured to perform various steps, functions, and/or operations in accordance with the present disclosure.

Thus, although only a single application server (AS) 104 is illustrated, it should be noted that any number of servers may be deployed, and which may operate in a distributed and/or coordinated manner as a processing system to perform operations for providing a two-dimensional subframe and a reduced resolution version of a frame of a volumetric video, in accordance with the present disclosure. In one example, AS 104 may comprise a physical storage device (e.g., a database server), to store various types of information in support of systems for providing a two-dimensional subframe and a reduced resolution version of a frame of a volumetric video, in accordance with the present disclosure. For example, AS 104 may store a library of volumetric videos or portions thereof (e.g., a plurality of frames), one or more reduced resolution versions of various volumetric videos (e.g., reduced resolution versions of the frames thereof), one or more 2D subframes of various volumetric video frames, "heatmaps" for volumetric videos, client device viewport histories, and so forth. For ease of illustration, various additional elements of network 102 are omitted from FIG. 1.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

In one example, the access network 120 may be in communication with a plurality of video capture devices, e.g., cameras 141-145. Similarly, access network 122 may be in communication with one or more devices, e.g., devices 132 and 133. Access networks 120 and 122 may transmit and receive communications between cameras 141-145, devices 132 and 133, and application server (AS) 104, other components of network 102, devices reachable via the Internet in general, and so forth. In one example, devices 132 and 133 may each comprise a mobile device, a cellular smart phone, a wearable computing device (e.g., smart glasses, a virtual reality (VR) headset, or the like), a laptop computer, a tablet computer, a desktop computer, or other types of personal computer, an application server, a bank or cluster of such devices, and the like. In one example, devices 132 and 133 may each comprise programs, logic or instructions for performing functions in connection with examples of the present disclosure for providing a two-dimensional subframe and a reduced resolution version of a frame of a volumetric video. For example, devices 132 and 133 may each comprise a computing system or device, such as computing system 500 depicted in FIG. 5, and may be configured to provide one or more operations or functions for presenting a two-dimensional subframe or a two-dimensional projection from a reduced resolution version of a frame of a volumetric video, as described herein. An example method 400 for presenting a two-dimensional subframe or a two-dimensional projection from a reduced resolution version of a frame of a volumetric video is described in greater detail below in connection with FIG. 4.

In the present example, a volumetric video may be captured from a scene at a physical location (e.g., in a physical environment 140). For instance, the cameras 141-145 may be deployed with different perspectives (e.g., different orientations and viewpoints) of the physical environment 140. In the present example, the cameras 141-145 may capture 2D videos of a building 170 and a bird 180. In one example, the volumetric video may be composited from the 2D videos obtained from the different cameras 141-145. For instance, the cameras 141-145 may feed the respective 2D videos to server 106, which may then compose the volumetric video using photogram metric techniques. For instance, the visual scene at the physical environment 140 may be represented in the volumetric video as voxels 165 having positional coordinates (e.g., X, Y, Z with respect to a reference point), color information (e.g., red, green, blue values and/or cyan, magenta, yellow values), transparency information (e.g., zero to 100 percent), shading information, texture information, and so forth. For instance, voxels 165 are illustrated as being assembled into a row 166, into a layer 167, and into a block, or point cloud 168 which may represent all or a portion of the physical environment 140. In one example, the set of information values for respective voxels may change from one frame of the volumetric video to the next as objects move through the physical environment 140, as lighting or other environmental conditions change, and so forth. Thus, server 106 may calculate information values for each voxel and for each frame from the 2D videos sourced from the cameras 141-145.

For illustrative purposes, the physical environment 140 may include a reference point 160 which may be associated with the building 170. For instance, the building 170 may comprise a known landmark, and reference point 160 may denote a corner of the building 170. Alternatively, or in addition, wireless beacons (not shown) in physical environment 140 having known locations may be used as reference points, such as Institute of Electrical and Electronics Engineers (IEEE) 802.15 based-beacons, IEEE 802.11 wireless routers and/or access points (AP), cellular base stations (or more particularly, the base station antennas), etc. For instance, cameras 141-145 may determine their respective positions via observed time difference of arrival (OTDA), barycentric triangulation, or a similar technique with reference to one or more wireless beacons. In one example, cameras 141-145 may provide to server 106 information from which the camera's perspective(s) may be quantified, such as: position information (e.g., GPS coordinates, coordinates and/or a position vector in relation to reference point 160, etc.), orientation information (e.g., azimuth and/or elevation information derived from a gyroscope and compass), and so forth. As such, server 106 may generate the volumetric video as photogrammetric combinations of the 2D videos in accordance with the perspective information from cameras 141-145. It should be noted that the foregoing describes an example where the 2D video feeds of cameras 141-145 are temporally aligned. However, in other, further, and different examples, a volumetric video may be composited from 2D source videos capturing the same physical environment 140, but at different times. For instance, the building 170 may be substantially unchanged over a time period from which different 2D source videos may be obtained.

In one example, the volumetric video (and/or one or more reduced resolution versions thereof) may be stored at server 106 and may be made available to other requesting devices, or may be provided by server 106 to AS 104 for storage and for providing to other requesting devices (e.g., edge proxy 108 and/or devices 132 and 133). To illustrate, a user 192 may submit via device 132 a request to experience the volumetric video (e.g., submitting the request to edge proxy 108, to AS 104, and/or to server 106). One or more of the edge proxy 108, AS 104, and/or server 106 may then be engaged to deliver 2D subframes and reduced resolution version(s) of one or more frames of the volumetric video to the device 132. For instance, any of the edge proxy 108, AS 104, and/or server 106 may comprise a computing system or server, such as computing system 500 depicted in FIG. 5, and may be configured to provide one or more operations or functions in connection with examples of the present disclosure for providing a two-dimensional subframe and a reduced resolution version of a frame of a volumetric video. An example method 300 for providing a two-dimensional subframe and a reduced resolution version of a frame of a volumetric video is described in greater detail below in connection with FIG. 3.

For example, the edge proxy 108 may obtain at least one frame of the volumetric video, e.g., from server 106 and/or from AS 104. Alternatively, or in addition, the edge proxy 108 may already have the at least one frame cached/stored therein. For instance, the edge proxy 108 may have recently streamed 2D subframes and reduced resolution version(s) of one or more frames of the volumetric video to a different device, and the at least one frame of the volumetric video and/or the 2D subframes may remain stored therein. Edge proxy 108 may also obtain a viewport of device 132. For example, device 132 may transmit information regarding a current viewport (e.g., a location of device 132 within the space 150 and the perspective 138), a recent viewport, and/or a predicted viewport of the device 132. In one example, edge proxy 108 may calculate a predicted viewport based upon current and/or recent viewport information provided by the device 132. In any case, the edge proxy 108 may generate a 2D subframe comprising a 2D projection of a frame of the volumetric video, based upon the viewport of the device 132 (e.g., based upon the viewport that is received, or a predicted viewport based, at least in part, upon the viewport that is received). In addition, the edge proxy 108 may also transcode the frame of the volumetric video into a reduced resolution version of the frame of the volumetric video. For instance, the reduced resolution version of the frame may be generated via voxel downsampling, color space reduction, or other techniques that do not output an encoded result. Alternatively, or in addition, the reduced resolution version of the frame may be generated via one or more lossy or lossless intraframe and/or interframe compression/encoding techniques, such as octree-based encoding, transform coding, entropy coding, and so forth which output an encoded/compressed result.

In one example, the edge proxy 108 may first check whether a local copy of the 2D subframe (corresponding to the predicted viewport) and/or a local copy of the reduced resolution version of the frame is/are available. If so, the edge proxy 108 may omit one or both of the above steps. In such case, the edge proxy 108 may instead retrieve the 2D subframe and/or the reduced resolution version of the frame. The edge proxy 108 may then transmit the 2D subframe and the reduced resolution version of the frame to the device 132 for display to the user 192. For instance, the edge proxy 108 may transmit a stream of 2D subframes and reduced resolution versions of a sequence of frames to the device 132.

It should be noted that various additional operations may be performed by edge proxy 108, such as applying a machine learning model (MLM) to obtain the predicted viewport for each frame based upon various inputs, obtaining information regarding popular viewports of other viewers of the same volumetric video, decoding the volumetric video stream (e.g., where the volumetric video is obtained from AS 104 and/or server 106 in a compressed/encoded format), generating a 2D subframe for each frame, and so forth. Edge proxy 108 may also obtain information regarding the capabilities of device 132 and/or network conditions between edge proxy 108 and device 132. Edge proxy 108 may then adjust the data size of the reduced resolution version(s) of one or more frames, and/or adjust the data size of one or more 2D subframes. For instance, the edge proxy 108 may select data size(s) for one or both of the 2D subframes or reduced resolution version(s) of one or more frames such that the data streamed by edge proxy 108 to device 132 is less than a network throughput that is available to service the device 132, such that the data streamed is decodable or otherwise renderable by the device 132 so as to provide a minimum frame rate (e.g., greater than 20 frames per second (FPS), greater than 32 FPS, etc.), and so forth.

When providing a viewing experience of the volumetric video, device 132 and/or user 192 via device 132 may provide commands to start, stop, pause, resume, etc. to change the viewport, and so on. For instance, a user interface of device 132 may provide for the user 192 to move a viewport left/right, up/down, forward/backward, etc., to select coordinates or define a position with respect to a reference point (e.g., reference point 160), and so forth. In one example, the user 192 may change viewports by changing a location, e.g., by walking, changing a focus, e.g., by moving the user's head and/or eyes, changing a zoom level via a specific command and/or via eye adjustment, and so on.

In one example, device 132 may obtain a sequence of 2D subframes and may determine if a viewport of a 2D subframe matches a current/actual viewport of the device 132 at a time corresponding to an associated frame. If there is a match, device 132 may decode the 2D subframe (if encoded) for rendering via the display components of the device 132, and may present the 2D subframe via the display components. On the other hand, if the device 132 determines that the 2D subframe does not match the actual viewport for the associated frame, the device 132 may, based upon the actual viewport, render visual information from the reduced resolution version of the frame for display (broadly a "two-dimensional projection"), and present the visual information via the display components of the device 132. Alternatively, or in addition, device 132 may be paired with another local computing device (not shown), such as a personal computer or a mobile device (e.g., a smartphone) of user 192, for performing operations or functions for decoding 2D subframes (e.g., a stream comprising a plurality of 2D subframes), for selecting when to display a 2D subframe in accordance with an actual viewport of the device 132, for selecting when to render and display visual information from the reduced resolution version of the frame instead of using the 2D subframe that is obtained, and so forth.

As further illustrated in FIG. 1, another user 193 may also experience the volumetric video via the device 133. For instance, device 133 may comprise a mobile computing device, such as a smartphone, a tablet, or the like with a 2D display screen. In one example, edge proxy 108 may provide a 2D output video comprising a 2D projection of the volumetric video from a sequence of viewports to device 133. Specifically, each frame of the volumetric video may be transcoded into a different 2D subframe corresponding to a predicted viewport. Device 133 may provide at least one viewport (e.g., a current viewport, one or more recent viewports, and/or one or more predicted viewports of the device 133) to the edge proxy 108. Alternatively, or in addition, edge proxy 108 may calculate a viewport (e.g., a predicted viewport) for each frame based upon current and/or recent viewport information provided by the device 133. In any case, the edge proxy 108 may then render a plurality of 2D subframes comprising 2D projections of a sequence of frames of the volumetric video, based upon the predicted viewports of the device 133. As described above, edge proxy 108 may alternatively or additionally check a local cache to determine if any of the 2D subframes have already been generated and stored therein. As further describe above, edge proxy 108 may further check if a reduced resolution version of a frame is available at a local cache. If not, the edge proxy 108 may generate the reduced resolution version of the frame (and similarly for other frames). The edge proxy 108 may then transmit the plurality of 2D subframes and the corresponding reduced resolution versions of the frames of the volumetric video to the device 133 for display to the user 193. It should be noted that various additional operations as described above may also be performed by edge proxy 108 and/or device 133.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. For instance, edge proxy 108 may comprise a CDN edge server, server 106 may comprise an ingest server, and so on. Similarly, although only two access networks, 120 and 122 are shown, in other examples, access networks 120 and/or 122 may each comprise a plurality of different access networks that may interface with network 102 independently or in a chained manner. In one example, the system 100 may further include wireless or wired connections to sensors, radio frequency identification (RFID) tags, or the like from which devices may determine locations/positions, ranges/distances, bearings, and so forth within physical environment 140.

In one example, application server 104 may comprise network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access networks 120 and 122 comprise radio access networks, the nodes and other components of the respective access networks 120 and 122 may be referred to as mobile edge infrastructure. As just one example, edge proxy 108 may be instantiated on one or more servers hosting virtualization platforms for managing one or more virtual machines (VMs), containers, microservices, or the like. In other words, in one example, edge proxy 108 may comprise a VM, a container, a microservice, or the like. Thus, these and other modifications are all contemplated within the scope of the present disclosure.

Figure 2:
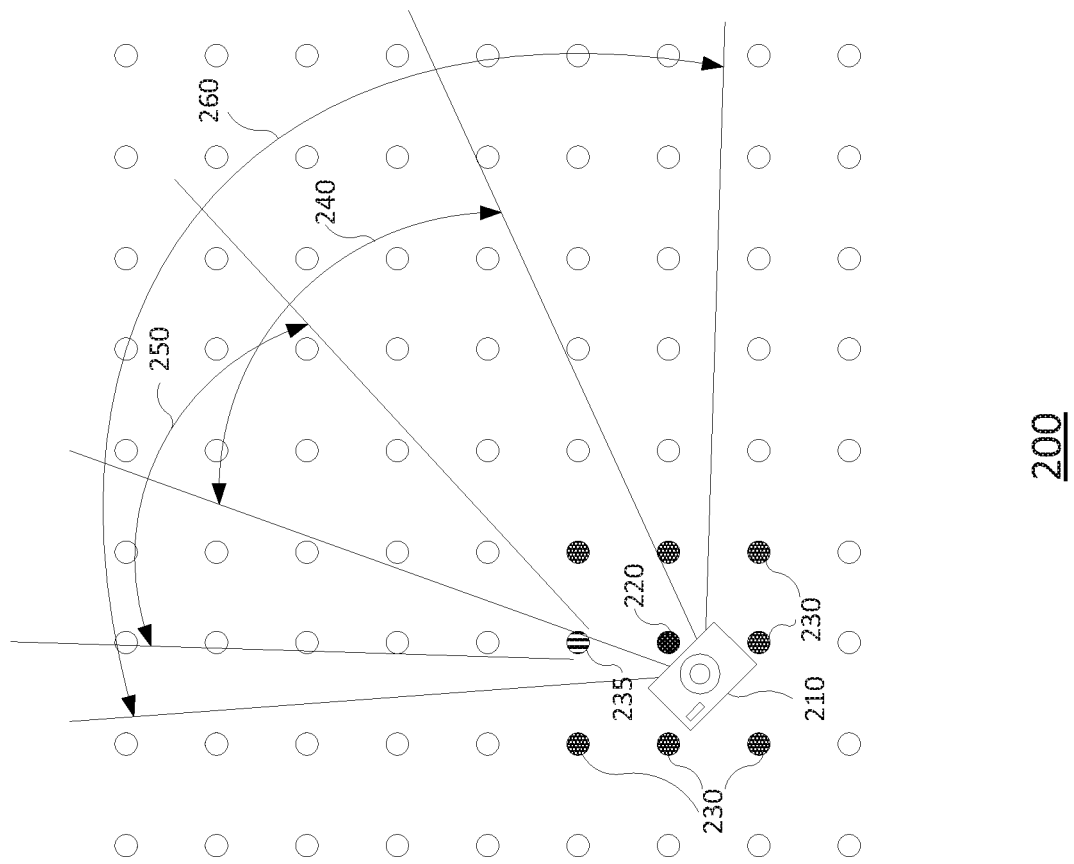
FIG. 2 illustrates an example of a plurality of potential camera positions for a volumetric video, in accordance with the present disclosure.

FIG. 2 illustrates an example of a plurality of potential camera positions 200. In one example, the plurality of potential camera positions 200 may correspond to voxels in three dimensions. However, for ease of illustration, a 2D slice is depicted in FIG. 2. In the example of FIG. 2, the camera 210 represents a viewport location 220 (which may correspond to a voxel or point in space). The orientation of the viewport is in the direction illustrated by the field of view (FOV) 240. In accordance with the present disclosure, a first 2D subframe may be rendered for the first viewport. The first 2D subframe may comprise a 2D projection of the voxels of the point cloud that fall within the FOV 240. The first viewport may be predicted based upon one or more recent viewports of a client device. For instance, in one example, a network-based proxy that is generating the first 2D subframe may utilize one or more machine learning models (MLMs) to predict the viewport movement. In 3 DoF panoramic video streaming, it has been demonstrated that yaw, pitch, and roll can be accurately predicted in the near future (less than 0.5 seconds or so), and such MLMs may be similarly applied in the context of volumetric video viewport prediction. Leveraging several short-term prediction algorithms, the network-based proxy may dynamically determine for each frame a predicted viewport's position and orientation (and in some cases a FOV size). Several factors may be used as inputs to the MLM(s), such as: the speed, direction, and mode (orbit, zoom, pan) of the viewport movement, information regarding viewport popularity with other viewers (e.g., "heatmaps"), information regarding the viewer interests, and so forth.

Similarly, a second 2D subframe may be rendered for a second viewport, e.g., a predicted viewport for a next frame. It should be noted that the next frame may comprise a point cloud that is different from the point cloud for the preceding frame. However, for ease of illustration, the second viewport may be represented in FIG. 2 by the camera 210 being moved to a candidate position 235 (e.g., corresponding to a different point/voxel) and having the orientation in the direction of FOV 250. The second viewport may be predicted in the same or a similar manner as the first viewport and the second 2D subframe may comprise a 2D projection of the voxels of the point cloud that fall within the FOV 240. For instance, the viewport movement may be predicted using machine learning or other predictive techniques, and may consider several candidate positions (e.g., candidate position 230 corresponding a point/voxel nearby to the viewport location 220) and several candidate orientations for evaluation in order to select a best or most likely viewport.

In one example, the network-based proxy may enlarge the first 2D subframe to include data for greater than the FOV (such as range 260) to tolerate possible rotational movement. In one example, a larger-than-FoV subframe may be generated using a panoramic representation such as an equirectangular representation or CubeMap representation, such that any FoV covered by the subframe can be restored. In one example, the network-based proxy may encode multiple 2D subframes for transmission to a client device. For instance, even allowing for viewport movement and for visual changes in the volumetric video, temporally adjacent 2D subframes in a sequence may still have certain visual similarities, allowing efficient cross-subframe (interframe) compression. For instance, interframe compression for 2D subframes may be in accordance with H.264/H.256 or similar video compression codecs.

Figure 3:
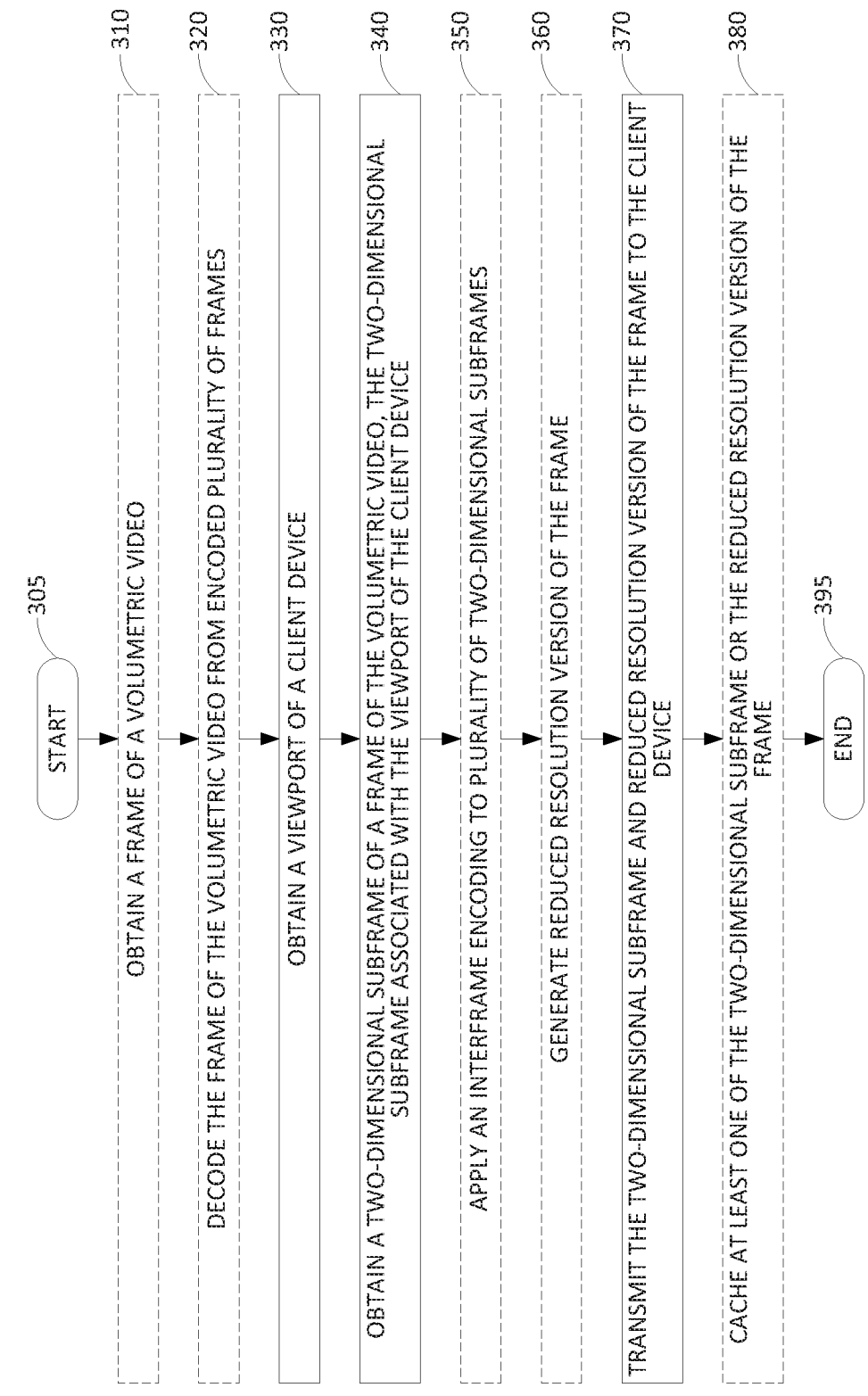
FIG. 3 illustrates a flowchart of an example method for providing a two-dimensional subframe and a reduced resolution version of a frame of a volumetric video, in accordance with the present disclosure.

FIG. 3 illustrates a flowchart of a method 300 for providing a two-dimensional subframe and a reduced resolution version of a frame of a volumetric video, in accordance with the present disclosure. In one example, the method 300 is performed by a component of the system 100 of FIG. 1, such as by one of the edge proxy 108, AS 104, server 106, and so forth, and/or any one or more components thereof (e.g., a processor, or processors, performing operations stored in and loaded from a memory), or by a plurality of such devices in conjunction with one another, and so on. In one example, the steps, functions, or operations of method 300 may be performed by a computing device or system 500, and/or processor 502 as described in connection with FIG. 5 below. For instance, the computing device or system 500 may represent any one or more components of one or more components of the system 100 of FIG. 1 that is/are configured to perform the steps, functions and/or operations of the method 300. Similarly, in one example, the steps, functions, or operations of method 300 may be performed by a processing system comprising one or more computing devices collectively configured to perform various steps, functions, and/or operations of the method 300. For instance, multiple instances of the computing device or processing system 500 may collectively function as a processing system. For illustrative purposes, the method 300 is described in greater detail below in connection with an example performed by a processing system. The method 300 begins in step 305 and may proceed to one of the optional steps 310 or 320, or to step 330.

At optional step 310, the processing system may obtain a frame of a volumetric video. For instance, the processing system may store a copy of the volumetric video and/or one or more frames thereof. Alternatively, the processing system may obtain the frame of the volumetric video from a content server, e.g., a storage server, a CDN ingest or edge server, and so forth. The frame may comprise a point cloud, or a three dimensional mesh, for instance. In one example, the frame may be received as a volumetric video stream (e.g., a sequence of frames). In one example, the frame is obtained in response to a request from a client (e.g., an endpoint device) for the volumetric video and/or at least a portion of the volumetric video. In one example, the frame of the volumetric video is obtained as part of at least a portion of the volumetric video comprising an encoded plurality of frames. For instance, the plurality of frames may be interframe encoded. Alternatively, or in addition the plurality of frames may be obtained with each frame having an intraframe encoding.

At optional step 320, the processing system may decode the frame of the volumetric video from an encoded plurality of frames, e.g., in an example where the at least one frame is obtained at optional step 310 as part of a volumetric video stream that is encoded/compressed. For instance, the volumetric video may be encoded/compressed and may be delivered to the processing system and/or stored by the processing system as an encoded plurality of frames (e.g., a compressed volumetric video stream). Accordingly, optional step 320 may include decoding the encoded plurality of frames to recover the at least one frame (e.g., an uncompressed version thereof). For instance, the encoding/compression may comprise octree-based compression, may include interframe encoding (e.g., delta encoding) and so forth, and the processing system may reconstruct the original frames (or as accurate a representation as can be achieved) via the decoding.

At step 330, the processing system obtains a viewport of a client device. In one example, the viewport is a current viewport of the client device, or a recent viewport of the client device. In another example, the viewport comprises a predicted viewport that may be provided by the client device for an anticipated future time. The predicted viewport may be based upon a plurality of prior viewports. For instance, the predicted viewport may be predicted in accordance with a machine learning model (MLM). In one example, the viewport comprises a position and an orientation. The orientation may comprise, for example, a yaw and a pitch (or azimuth and elevation). The orientation may also comprise a roll (e.g., such as if a user tilts the display of the client device). In one example, the viewport further comprises a field-of-view (FOV), e.g., 60-90 degrees in two dimensions normal/perpendicular to the orientation, a rectangular or oval region corresponding to the limits of human peripheral vision, or a lesser or broader region, a region corresponding to the display capabilities of the client device, or a broader region thereof, and so on. In one example, the FOV may be implicit. For instance, the client device may provide a screen size or other indications of the FOV to the processing system as part of or in connection with an initial request from the client device to experience the volumetric video, where it is assumed that the FOV size does not change.

At step 340, the processing system obtains a two-dimensional (2D) subframe of a frame of the volumetric video, the 2D subframe associated with the viewport of the client device. For instance, the frame may be obtained at optional step 310, and step 340 may include generating the 2D subframe from the frame of the volumetric video. The 2D subframe may comprise a 2D projection of the volumetric video frame, based upon the viewport of the client device. In one example, the 2D subframe may be rendered to include visual information that exceeds the field-of-view using a panoramic representation (e.g., an equirectangular projection or cubemap).

In one example, the 2D subframe is rendered from a viewport comprising a predicted viewport. For instance, the viewport may not be the actual/current viewport, but one that is predicted, e.g., based upon the current viewport, one or more recent viewports prior to the current viewport, based upon the popular viewports among other users, popular viewports among other users with a time weighting, etc. The predicted viewport may be provided by the client device and obtained at step 330, or may be determined by the processing system as part of step 340. For instance, the predicted viewport may be determined in accordance with one or more MLMs that may be applied by the processing system.

To illustrate, step 340 may include generating a predicted viewport via a MLM based upon at least the viewport obtained at step 330. In one example, the MLM may generate the predicted viewport based upon a plurality of prior viewports, the plurality of prior viewports including the viewport obtained at step 330 (the inputs to the MLM may include the recent viewports at the client device). The MLM may learn a trajectory and anticipate a change in position of the viewport, may anticipate a change in orientation, etc. In addition, in one example, the MLM may account for what aspects of the volumetric video are most popular among other users (e.g., the most popular viewports for a particular frame or sequence of frames among other users). In one example, the MLM may also take into account user preferences regarding what is of interest to a user of the client device (e.g., whether the user is most interested in a particular player at a sporting event, most interested in a particular car in an auto race, etc.). In one example, step 340 may comprise generating a plurality of 2D subframes. For instance, each of the 2D subframes of the plurality of 2D subframes may be generated from a respective time sequential frame of the volumetric video in the same or a similar manner.

In addition, although the foregoing describes an example where the processing system generates the 2D subframe, e.g., from the frame obtained at optional step 310, it should be noted that in one example, step 340 may comprise first determining whether the 2D subframe is cached at the processing system and/or local to the processing system. If the processing system determines that the 2D subframe is already locally cached, the processing system may retrieve the cached/stored 2D subframe at step 340 and may omit the generating of the 2D subframe. The 2D subframe may be locally cached according to one or more criteria (such as described below in connection with optional step 380 and/or as described elsewhere herein).

At optional step 350, the processing system may encode the plurality of 2D dimensional subframes. For example, the encoding may comprise an interframe encoding/compression. The interframe encoding may be among time-sequential 2D subframes of the plurality of 2D subframes. For example, the encoding may comprise H.264/H.265 encoding/compression, and so forth. Alternatively, or in addition, step 350 may include intraframe encoding/compression, e.g., in accordance with intraframe aspects of H.264/H.265, via pixel sampling, color space reduction, resolution reduction, and so forth.

At optional step 360, the processing system may generate a reduced resolution version of the frame. In one example, the reduced resolution version of the frame may be generated via voxel sampling (no compression/encoding) but can also include lossless or lossy compression, which may then call for decoding at the client device. In one example, the generating of the reduced resolution version of the frame may comprise applying an octree-based compression to the frame. In one example, the processing system may perform an interframe encoding between the reduced resolution version of the frame and at least one additional reduced resolution version of at least one additional frame of the volumetric video, such as one or more sequentially adjacent frames, one or more other frames that is/are close in sequence to the frame (e.g., within 2 frames, within 5 frames, within 12 frames), etc. In one example, the interframe encoding may also be performed where the reduced resolution versions of the frames are also octree encoded. In one example, the original frame can also be reduced in resolution compared to a master copy at a highest available resolution. In such case, the reduced resolution version of the frame may be further reduced in resolution, e.g., representing the same visual information, but having a further reduced data size.

In one example, the reduced resolution version of the frame is selected based upon a throughput between the client device and the processing system. In other words, the levels and/or the techniques and parameters of data size reduction may be selected in accordance with the throughput. For example, the throughput may be measured via either or both of the processing system and the client device (where the client device may report measurements to the processing system). The processing system may then select the frame data size, the encoding rate, and/or compression level, such as octree depth, based upon the throughput. Alternatively, or in addition, the encoding parameters may be set in accordance with the capabilities of the client device (e.g., in accordance with screen size, a maximum screen resolution, a maximum frame rate for 2D video at a certain screen resolution, etc.), in accordance with network capabilities, such as a maximum bandwidth that may be provided to individual mobile devices (e.g., client devices) by a base station, processor and memory capabilities of the network-based proxy, and so forth. The examples given above may be for encoding/compression via multiple techniques, whereas encoding with fewer techniques may still enable the client device to receive, decode, and render an encoded/compressed frame (or a stream of a plurality of encoded/compressed frames) at a frame rate of greater than 24 FPS, greater than 32 FPS, greater than 60 FPS, etc.

In one example, the processing system may first determine whether a reduced resolution version of the frame is already locally cached. If available, the processing system may retrieve the reduced resolution version of the frame instead of generating it at optional step 360. The reduced resolution version of the frame may be locally cached according to one or more criteria (such as described below in connection with optional step 380 and/or as described elsewhere herein).

At step 370, the processing system transmits the 2D subframe and the reduced resolution version of the frame to the client device. The reduced resolution version of the frame may be generated at optional step 360 or may be retrieved by the processing system from a local cache prior to the transmitting. In one example, step 370 may comprise transmitting a sequence, or stream of 2D subframes (corresponding to a sequence of frames of the volumetric video) and a sequence, or stream of reduced resolution versions of the sequence of frames of the volumetric video.

In one example, the stream of reduced resolution versions of the sequence of frames may be similarly decoded by the client device. During playout, when a time T for presentation of visual content of a frame arises, the client device may determine whether an actual viewport matches a predicted viewport for the time T. When the actual viewport matches the predicted viewport, the 2D subframe for the frame associated with the time T may be presented. In such an example, the client device may decode one or more of the stream of 2D subframes, e.g., based upon an actual viewport determined at the client device matching the predicted viewport from which a 2D subframe is generated, and may display the decoded 2D subframe(s) via a display for the user. The decoding may be via H.264/H.265 decoders of the client device, for example. On the other hand, when the actual viewport does not match the predicted viewport, the client device may instead render a 2D projection from the reduced resolution version of the frame and present the visual information (the 2D projection) via the display for the user.

At optional step 380 the processing system may cache at least one of the 2D subframe or the reduced resolution version of the frame, e.g., at the processing system, such as in an internal component of the processing system and/or at one or more devices that are accessible and local to the processing system (e.g., in the same cloud zone, in the same edge cloud, in the same radio access network (RAN), etc.). Optional step 380 may be performed when the processing system generates either or both of the 2D subframe or the reduced resolution version of the frame at step 340 or step 360, respectively. The 2D subframe may be locally cached according to one or more criteria, such as a popularity of the viewport/perspective of the 2D subframe, e.g., within a portion of the network serviced by the processing system. For instance, a 2D subframe having a given viewport/perspective that is requested and/or displayed for more than X % of the previous viewing sessions may be cached. In another example, a 2D subframe having requests and/or displays exceeding a time-weighted threshold may be cached. In still another example, the X most requested 2D subframes of a frame may be cached. In one example, 2D subframes may be released from the cache in accordance with a least recently used (LRU) algorithm, or other cache replacement policies. Similarly, the reduced resolution version of the frame may be locally cached according to one or more criteria, such as a popularity of the volumetric video and/or at least a portion thereof that includes the frame, e.g., the volumetric video being within a top X % of most requested volumetric videos, a total number of requests in a time period exceeding a threshold, and so forth. Likewise, reduced resolution versions of frames of the volumetric video may be released from the cache in accordance with a least recently used (LRU) algorithm, or other cache replacement policies. Following step 370 or optional step 380, the method 300 proceeds to step 395 where the method ends.

It should be noted that the method 300 may be expanded to include additional steps, or may be modified to replace steps with different steps, to combine steps, to omit steps, to perform steps in a different order, and so forth. For instance, in one example the processor may repeat one or more steps of the method 300, such as steps 310-370 or steps 310-380 for additional frames of the volumetric video, for frames of a different volumetric video, for a different client device, and so on. In another example, the method 300 may include requesting and receiving the volumetric video, e.g., from a content server. In another example, the method 300 may include determining whether the at least one frame is already possessed by the processing system, e.g., before requesting the at least one frame from a content server or the like. In another example, the method 300 may include obtaining user preferences, obtaining information regarding popular viewports of the volumetric video, and so on. In still another example, the method 300 may include obtaining and applying training data to a MLA to produce a MLM for predicting a viewport. Thus, these and other modifications are all contemplated within the scope of the present disclosure.

Figure 4:
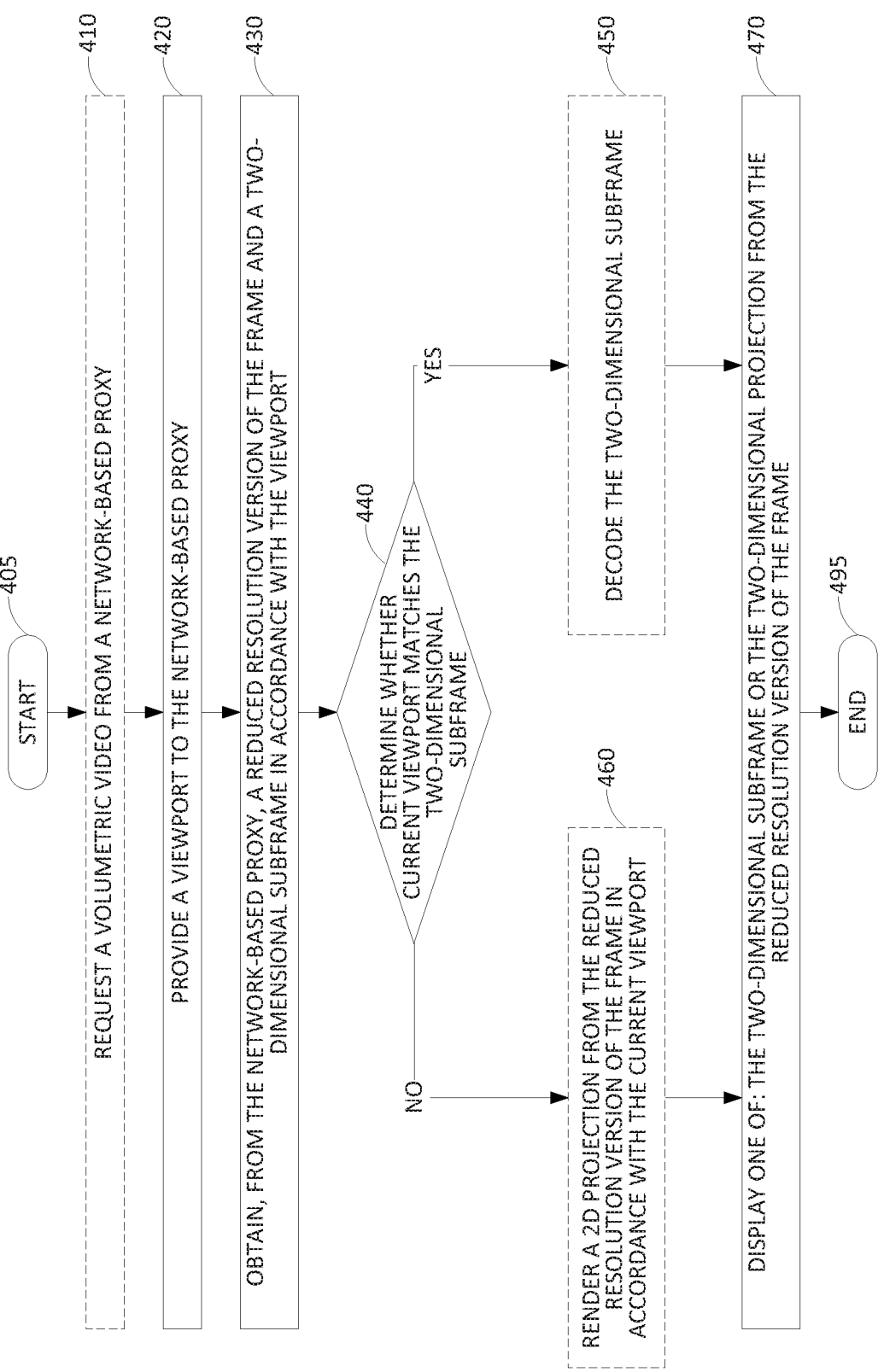
FIG. 4 illustrates a flowchart of an example method for presenting a two-dimensional subframe or a two-dimensional projection from a reduced resolution version of a frame of a volumetric video, in accordance with the present disclosure.

FIG. 4 illustrates a flowchart of a method 400 for presenting a two-dimensional subframe or a two-dimensional projection from a reduced resolution version of a frame of a volumetric video, in accordance with the present disclosure. In one example, the method 400 is performed by a component of the system 100 of FIG. 1, such as by one of device 132, device 133, and so forth, and/or any one or more components thereof (e.g., a processor, or processors, performing operations stored in and loaded from a memory), and so on. In one example, the steps, functions, or operations of method 400 may be performed by a computing device or system 500, and/or processor 502 as described in connection with FIG. 5 below. For instance, the computing device or system 500 may represent any one or more components of one or more components of the system 100 of FIG. 1 that is/are configured to perform the steps, functions and/or operations of the method 400. Similarly, in one example, the steps, functions, or operations of method 400 may be performed by a processing system comprising one or more computing devices collectively configured to perform various steps, functions, and/or operations of the method 400. For instance, multiple instances of the computing device or processing system 500 may collectively function as a processing system. For illustrative purposes, the method 400 is described in greater detail below in connection with an example performed by a processing system. The method 400 begins in step 405 and proceeds to optional step 410 or to step 420.

At optional step 410, the processing system may request a volumetric video from a network-based proxy (e.g., an "edge proxy" such as an edge server deployed in an edge cloud of a telecommunication network, from a CDN edge server, and so forth).

At step 420, the processing system provides a viewport to the network-based proxy. For example, the processing system may calculate a position and an orientation within a space of the volumetric video. In one example, the processing system may also determine a field-of-view (FOV). The position, orientation, and/or the FOV may be determined in accordance with the capabilities of the processing system (e.g., the size and resolution of the display), in accordance with a physical position and orientation of the processing system (e.g., determined via a gyroscope and compass, a global positioning system (GPS), or the like, via eye and/or gaze tracking, based upon distance estimates to one or more AR markers via a device camera, and so forth, and/or in accordance with one or more user inputs (e.g., a keyboard input, a gesture, a voice command, or the like instructing the processing system to move a viewport orientation up, down, left, right, etc., to move the viewport position forward, backward, left, right, up, down, etc., to zoom in or out, and so forth). In one example, step 420 may include calculating a predicted viewport. In other words, the viewport provided at step 420 may comprise the predicted viewport. For instance, the processing system (e.g., of a client device) may implement one or more MLMs for predicting a viewport as similarly described above in connection with step 330 and/or step 340 of the example method 300.

At step 430, the processing system obtains, from the network-based proxy: (1) a reduced resolution version of a frame and (2) a 2D subframe in accordance with the viewport. For instance, the 2D subframe may be selected and/or generated by the network-based proxy based upon the viewport provided at step 420. For example, the 2D subframe may comprise a 2D projection of the frame of the volumetric video, where the projection is based upon the viewport of the client device. In one example, the perspective of the 2D subframe may correspond to the viewport provided at step 420 (or may comprise a viewport that is predicted by the network-based proxy in accordance with the viewport provided at step 420). In addition, the network-based proxy may retrieve or generate the reduced resolution version of the frame. In one example, parameters for the reduced resolution version of the frame and/or for the 2D subframe may be selected by the processing system or by the network-based proxy in accordance with the capabilities of the processing system (e.g., of the client device) and/or network capabilities, such as a throughput between the processing system and the network-based proxy. For instance, the parameters for the 2D subframe may include a data size of the 2D subframe, a color space size, etc. Similarly, the parameters for the reduced resolution version of the frame may include a data size (e.g., a number of voxels), an octree depth, and so on.

At step 440, the processing system determines whether a current viewport (e.g., a most current position, orientation, and/or FOV) matches the 2D subframe (e.g., whether the user/device perspective at the time for presentation of visual information from the frame matches the predicted viewport/perspective from which the 2D subframe of the frame is generated). When it is determined that the current viewport matches the 2D subframe, the method 400 may proceed to optional step 450 or to step 470. Otherwise, the method 400 may proceed to step 460.

At optional step 450, the processing system may decode the 2D subframe (e.g., when it is determined that the current viewport matches the 2D subframe and when the 2D subframe is encoded). For example, as described above, the 2D subframe (and/or a sequence of 2D subframes including the 2D subframe) may be encoded/compressed via one or more techniques, such that decoding may precede the displaying to follow at step 470. In one example, the decoding may be via H.264/H.265 decoders which may be part of the processing system, or which are made available to and which are utilized by the processing system.

As mentioned above, when it is determined at step 440 that the current viewport does not match the 2D subframe that is obtained, the method 400 may instead proceed to step 460. At step 460, the processing system renders a 2D projection from the reduced resolution version of the frame in accordance with the current viewport. For instance, step 460 may comprise similar operations as describe above in connection with step 340 of the method 300. It should be noted that the 2D projection generated at step 460 may also be considered a different "2D subframe" of the frame. Following step 460, the method 400 may proceed to step 470.

At step 470, the processing system displays one of: the 2D subframe or the 2D projection from the reduced resolution version of the frame (e.g., where one or the other is displayed in accordance with the determination at step 440 of whether the current viewport matches the 2D subframe). For example, step 460 may comprise presenting the 2D subframe or the 2D projection from the reduced resolution version of the frame via display hardware of the processing system and/or sending raw data of the two-dimensional subframe to display hardware in communication with the processing system for presentation thereon. Following step 470, the method 400 proceeds to step 495 where the method ends.

It should be noted that the method 400 may be expanded to include additional steps, or may be modified to replace steps with different steps, to combine steps, to omit steps, to perform steps in a different order, and so forth. For instance, in one example the processor may repeat one or more steps of the method 400, such as steps 420-470 for additional frames of the volumetric video, steps 410-470 for a different volumetric video, and so on. It should also be noted that step 460 may or may not be performed in any given iteration of the method 400 depending upon the outcome of step 440. Thus, these and other modifications are all contemplated within the scope of the present disclosure.

In addition, although not expressly specified above, one or more steps of the method 300 or the method 400 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 or FIG. 4 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

FIG. 5 depicts a high-level block diagram of a computing device or processing system specifically programmed to perform the functions described herein. For example, any one or more components or devices illustrated in FIG. 1, or described in connection with the method 300 of FIG. 3 or the method 400 of FIG. 4 may be implemented as the processing system 500. As depicted in FIG. 5, the processing system 500 comprises one or more hardware processor elements 502 (e.g., a microprocessor, a central processing unit (CPU) and the like), a memory 504, (e.g., random access memory (RAM), read only memory (ROM), a disk drive, an optical drive, a magnetic drive, and/or a Universal Serial Bus (USB) drive), a module 505 for providing a two-dimensional subframe and a reduced resolution version of a frame of a volumetric video or for presenting a two-dimensional subframe or a two-dimensional projection from a reduced resolution version of a frame of a volumetric video, and various input/output devices 506, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 502 can also be configured or programmed to cause other devices to perform one or more operations as discussed above. In other words, the hardware processor 502 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 505 for providing a two-dimensional subframe and a reduced resolution version of a frame of a volumetric video or for presenting a two-dimensional subframe or a two-dimensional projection from a reduced resolution version of a frame of a volumetric video (e.g., a software program comprising computer-executable instructions) can be loaded into memory 504 and executed by hardware processor element 502 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for providing a two-dimensional subframe and a reduced resolution version of a frame of a volumetric video or for presenting a two-dimensional subframe or a two-dimensional projection from a reduced resolution version of a frame of a volumetric video (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
predicting, by a server including at least one processor, a viewport needed by a client device for a volumetric video, the predicted viewport comprising a viewing perspective for use in rendering two-dimensional content based on three-dimensional content;
generating, by the server, a two-dimensional subframe from a frame of the volumetric video, wherein the two-dimensional subframe is generated based upon the predicted viewport of the client device and comprising a two-dimensional view of the frame of the volumetric video as such frame appears from the viewing perspective of the predicted viewport;
generating, by the server, a three-dimensional reduced resolution version of the frame of the volumetric video, wherein the three-dimensional reduced resolution version of the frame of the volumetric video is of a reduced video quality compared with the frame of the volumetric video, and wherein the three-dimensional reduced resolution version of the frame of the volumetric video is generated without use of the predicted viewport; and
transmitting, by the server to the client device, the two-dimensional subframe and the three-dimensional reduced resolution version of the frame of the volumetric video.

2. The method of claim 1, wherein the predicted viewport is predicted in accordance with a machine learning model.

3. The method of claim 2, wherein the predicted viewport is predicted in accordance with the machine learning model based upon at least one viewport received from the client device.

4. The method of claim 1, further comprising:
obtaining the frame of the volumetric video.

5. The method of claim 4, wherein the frame of the volumetric video is obtained as part of at least a portion of the volumetric video comprising a plurality of encoded frames, wherein the method further comprises:
decoding the frame of the volumetric video from the plurality of encoded frames.

6. The method of claim 4, wherein the generating the three-dimensional reduced resolution version of the frame comprises:
performing an interframe encoding between the three-dimensional reduced resolution version of the frame and at least one additional three-dimensional reduced resolution version of at least one additional frame of the volumetric video.

7. The method of claim 4, wherein the generating the three-dimensional reduced resolution version of the frame comprises applying an octree-based compression.

8. The method of claim 1, wherein the three-dimensional reduced resolution version of the frame is generated based upon a throughput between the client device and the server.

9. The method of claim 1, wherein the frame of the volumetric video comprises:
a point cloud; or
a three-dimensional mesh.

10. The method of claim 1, where the generating the two-dimensional subframe comprises generating a plurality of two-dimensional subframes, wherein each of the plurality of two-dimensional subframes is generated from a respective time sequential frame of the volumetric video, the method further comprising:
applying an interframe encoding to the plurality of two-dimensional subframes.

11. The method of claim 1, further comprising:
caching, by the server, at least one of:
the two-dimensional subframe; or
the three-dimensional reduced resolution version of the frame.

12. The method of claim 1, wherein the predicted viewport comprises a position and an orientation.

13. The method of claim 12, wherein the orientation comprises a yaw, a pitch, and a roll.

14. The method of claim 4, wherein the generating the three-dimensional reduced resolution version of the frame comprises applying compression.

15. A server comprising:
a processor; and
a computer-readable medium storing instructions which, when executed by the processor, cause the processor to perform operations, the operations comprising:
predicting a viewport needed by a client device for a volumetric video, the predicted viewport comprising a viewing perspective for use in rendering two-dimensional content based on three-dimensional content;
generating a two-dimensional subframe from a frame of the volumetric video, wherein the two-dimensional subframe is generated based upon the predicted viewport of the client device and comprising a two-dimensional view of the frame of the volumetric video as such frame appears from the viewing perspective of the predicted viewport;
generating a three-dimensional reduced resolution version of the frame of the volumetric video, wherein the three-dimensional reduced resolution version of the frame of the volumetric video is of a reduced video quality compared with the frame of the volumetric video, and wherein the three-dimensional reduced resolution version of the frame of the volumetric video is generated without use of the predicted viewport; and
transmitting, to the client device, the two-dimensional subframe and the three-dimensional reduced resolution version of the frame of the volumetric video.

16. The server of claim 15, wherein the predicted viewport is predicted in accordance with a machine learning model.

17. The server of claim 15, wherein the three-dimensional reduced resolution version of the frame is generated based upon a throughput between the client device and the server.

18. A non-transitory computer-readable medium storing instructions which, when executed by a server including at least one processor, cause the server to perform operations, the operations comprising:

predicting a viewport needed by a client device for a volumetric video, the predicted viewport comprising a viewing perspective for use in rendering two-dimensional content based on three-dimensional content;

generating a two-dimensional subframe from a frame of the volumetric video, wherein the two-dimensional subframe is generated based upon the predicted viewport of the client device and comprising a two-dimensional view of the frame of the volumetric video as such frame appears from the viewing perspective of the predicted viewport;

generating a three-dimensional reduced resolution version of the frame of the volumetric video, wherein the three-dimensional reduced resolution version of the frame of the volumetric video is of a reduced video quality compared with the frame of the volumetric video, and wherein the three-dimensional reduced resolution version of the frame of the volumetric video is generated without use of the predicted viewport; and transmitting, to the client device, the two-dimensional subframe and the three-dimensional reduced resolution version of the frame of the volumetric video.

19. The non-transitory computer-readable medium of claim 18, wherein the predicted viewport is predicted in accordance with a machine learning model.

20. The non-transitory computer-readable medium of claim 18, wherein the three-dimensional reduced resolution version of the frame is generated based upon a throughput between the client device and the server.

* * * * *